UNITED STATES PATENT OFFICE.

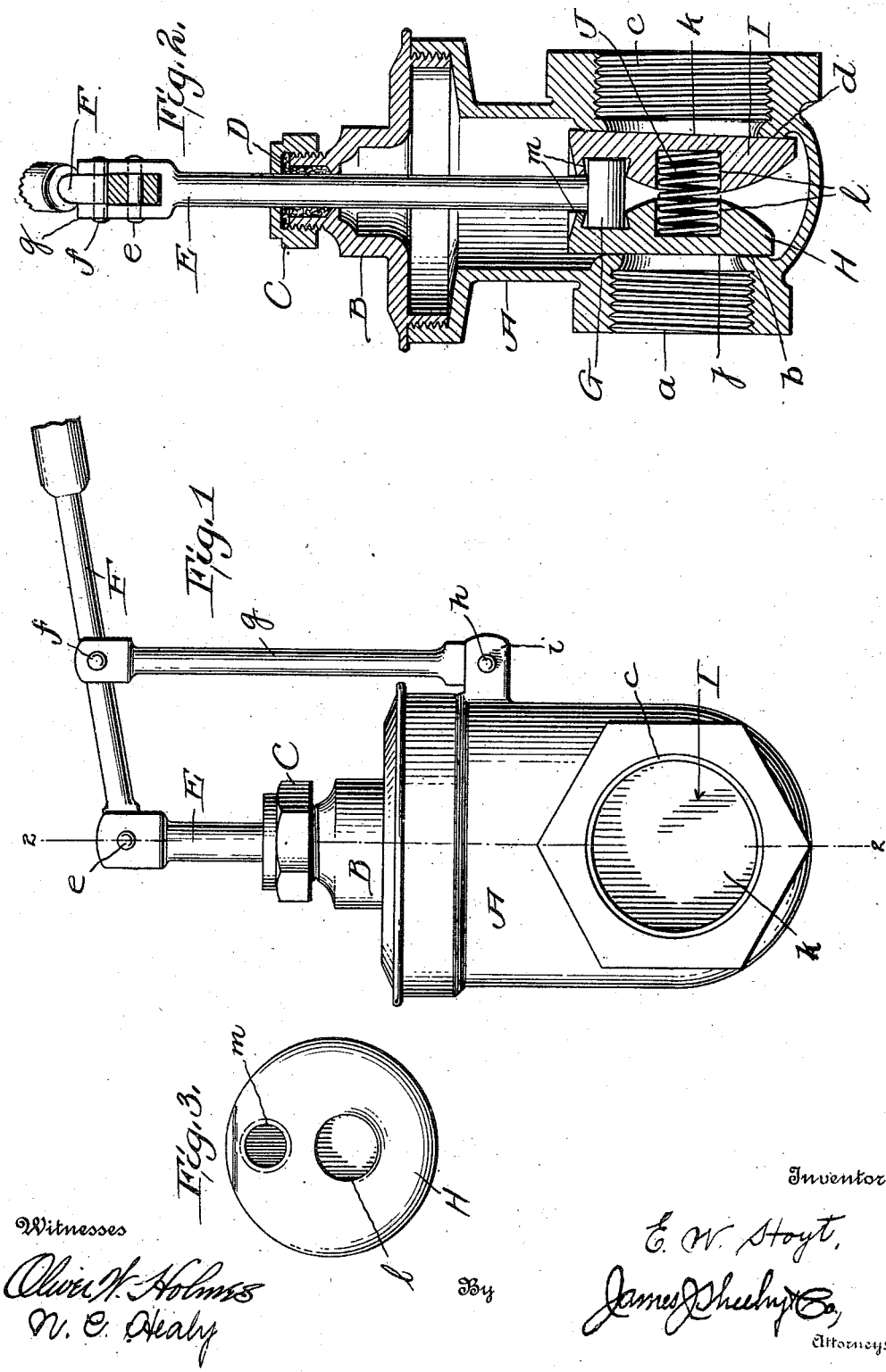

EUGENE W. HOYT, OF DECORAH, IOWA.

SLIDING GATE-VALVE.

973,435.  Specification of Letters Patent.  Patented Oct. 18, 1910.

Application filed May 31, 1910. Serial No. 564,156.

*To all whom it may concern:*

Be it known that I, EUGENE W. HOYT, citizen of the United States, residing at Decorah, in the county of Winneshiek and State of Iowa, have invented new and useful Improvements in Sliding Gate-Valves, of which the following is a specification.

My present invention pertains to sliding gate valves of the self-grinding type; and it consists in the peculiar and advantageous valve, hereinafter described and claimed, designed more particularly for use as a blowoff valve.

In the drawings, accompanying and forming part of this specification: Figure 1 is an elevation of a valve constructed in accordance with my invention. Fig. 2 is a vertical section of same taken at a right angle to Fig. 1. Fig. 3 is an elevation showing the inner side of one of the sections of the valve body.

Similar letters designate corresponding parts in all of the views of the drawings, referring to which:

A is the casing of my novel valve, which is provided with an inlet port $a$ and a valve seat $b$ at the inner end of said inlet port, and is also provided with an outlet port $c$ arranged in alinement with the inlet port $a$ and a valve seat $d$ at the inner end of said outlet port. The valve seat $b$ is preferably perpendicular to the inlet port $a$, while the valve seat $d$ is slightly inclined from the perpendicular, as clearly shown in Fig. 2. It will also be readily observed by reference to Fig. 2 that the outlet port $c$ is larger in cross-section than the inlet port $a$, in about the proportion illustrated, this being materially advantageous in that it affords a clear passage through the casing for mud, slime and dirt and lessens the liability of the same touching or lodging on the seats and giving rise to undue wear.

The casing A is preferably equipped with a bonnet B that bears a gland C, and extending through the gland and the packing D confined therein is the stem E of the valve. This stem E may be raised and lowered in any manner consistent with the purpose of my invention, though I prefer to raise and lower it through the medium of a hand lever F which is pivoted at $e$ to the stem and is fulcrumed at $f$ on a support $g$ which latter, in turn, is pivoted at $h$ to a projection $i$ extending laterally from the casing A.

At its lower or inner end the stem E is provided with a T-head G, of circular form in cross-section, which T-head carries the sections H and I of the valve body. The section H is slightly smaller than the section I, and its face $j$, which is opposed to the valve seat $b$, is perpendicular to the inlet port $a$. The face $k$ of the section I is disposed as shown in Fig. 2 when the valve is closed. The inner or opposed sides of the sections H and I are, by preference, partly convex, as shown, and the sections are provided with registered sockets $l$ for the reception of a coiled spring J, and are also provided with registered recesses $m$, of circular form in cross-section, which receive the T-head G on stem E. It will also be observed by reference to Fig. 2 that the side walls of the recesses $m$ are undercut or beveled, this in order to retain the sections H and I in place so the same can rock under the action of the spring J when the valve is open.

In the practical use of the valve it will be manifest that by virtue of the seat $d$ being inclined, and the spring J being interposed between the body sections H and I, the closing of the valve will be attended by grinding of the seats $b$ and $d$, thereby assuring clean seats and tight seating of the body formed by the sections H and I. It will also be manifest that incidental to the closing of the valve, the ability of the sections H and I to move with respect to each other enables the said sections to conform nicely to and bear tightly against their seats. It will further be manifest that incidental to the opening of the valve, the spring J will yieldingly press the body sections against their seats until the valve is fully opened, and that this together with the large size in cross-section of the outlet port $c$ will assure the seats being at all times clean.

Having described my invention, what I claim and desire to secure by Letters-Patent, is:

1. In a sliding gate valve, the combination of a casing having an inlet port and an outlet port, of comparatively large size in cross-section, alined with the inlet port, and also having seats at the inner ends of said ports, one of said seats being inclined, a rectilinearly movable stem having a T-head, of circular form in cross-section, at its inner end, body sections having registered sockets and registered recesses in their inner sides, the side walls of which recesses are undercut or beveled and which recesses receive the ends of said T-head, and a coiled spring interposed between said sections and arranged in the sockets thereof.

2. In a sliding gate valve, the combination of a casing having an inlet port and an outlet port, of comparatively large size in cross-section, alined with the inlet port, and also having seats at the inner ends of said ports, one of said seats being inclined, a stem movable in the casing, body sections carried by the stem and movable with respect to each other; and a spring interposed between said body sections.

In testimony whereof I have hereunto set my hand in presence of two subscribing witnesses.

EUGENE W. HOYT.

Witnesses:
R. ALGYER,
B. W. OLSON.